May 13, 1969 H. M. BLINN 3,444,325
ALARM DIALING AND TRANSMITTING SYSTEM WITH MESSAGE TRANSMISSION
RESPONSIVE TO CHANGE OF POLARITY ON TELEPHONE LINES
Filed Dec. 13, 1967 Sheet 1 of 4

INVENTOR.
HERBERT M. BLINN
BY Lockwood, Woodard, Smith & Weikart
Attorneys

INVENTOR.
HERBERT M. BLINN
BY Lockwood, Woodard, Smith & Weikart
Attorneys

INVENTOR.
HERBERT M. BLINN
BY
Woodard, Weikart, Emhardt & Naughton
Attorneys

INVENTOR.
HERBERT M. BLINN
BY
Woodard, Weikart, Emhardt & Naughton
Attorneys 3,444,325

ALARM DIALING AND TRANSMITTING SYSTEM WITH MESSAGE TRANSMISSION RESPONSIVE TO CHANGE OF POLARITY ON TELEPHONE LINES

Herbert M. Blinn, 319 E. 121st Ave., Tampa, Fla. 33612
Continuation-in-part of application Ser. No. 426,840, Jan. 21, 1965. This application Dec. 13, 1967, Ser. No. 699,281
Int. Cl. H04m 11/04
U.S. Cl. 179—5 5 Claims

ABSTRACT OF THE DISCLOSURE

Alarm dialing and transmitting equipment for use with conventional telephone equipment and including cam operated means for dialing a predetermined party and for playing a recorded message to the recorded party. The equipment is arranged to automatically continue calling the predetermined party until the party answers and signals back to the equipment with a given signal.

CROSS REFERENCES TO RELATED APPLICATIONS

This application is a continuation-in-part of application Ser. No. 426,840, filed Jan. 21, 1965, now abandoned.

BACKGROUND OF THE INVENTION

*Field of the invention*

The present invention relates to alarm dialing and transmitting equipment.

*Description of the prior art*

There are prior art devices for automatically dialing a telephone number and for delivering a recorded message to the party at the other end of the line. Such devices might find important utility as means for sounding the alarm in the case of a robbery of a bank or the breaking and entering of an elderly lady's home or similar situations. Such prior art devices have not found wide acceptance for a number of reasons. For example, these devices incorporate expensive cumbersome means for lifting the handpiece of the telephone off of the hook. Also they make no provision for the failure of the answering party to answer because of a busy signal or because the telephone central office is temporarily overloaded with connected circuits.

SUMMARY OF THE INVENTION

One embodiment of the present invention might involve an automatic alarm system for use with a telephone arrangement including a tip lead and a ring lead, central office equipment connected to said tip lead and ring lead and arranged to reverse the DC polarity thereon when the set at a dialed subscriber's station is answered, said alarm system comprising a means for connecting said tip lead and said ring lead through a low impedance path to seize the central office equipment, means for placing a pulsing signal across said tip and ring leads to dial a subscriber's station through said central office equipment, means responsive to changed polarity on the tip and ring leads for placing a recorded message signal across the tip and ring leads to thereby deliver said message to the subscriber's station, and means for continuing the operation of said alarm system until a predetermined response is received from said subscriber's station.

A primary object of the present invention is to provide improved alarm dialing and transmitting equipment.

Another object of the invention is to provide alarm dialing and transmitting equipment which eliminates cumbersome expensive means for lifting the handpiece off of the hook.

A further object of the invention is to provide alarm dialing and transmitting equipment which is not prevented from delivering the alarm because of a busy signal or overload signal.

Still another object of the invention is to provide alarm dialing and transmitting equipment which does not have to be mounted in full view adjacent the conventional telephone set whereby a burglar or robber can easily damage the equipment or rip out the wires of the equipment.

Still a further object of the invention is to provide alarm dialing and transmitting equipment which operates to repeatedly dial a predetermined telephone station until such time as that station is answered and a proper response delivered from that station or until such time as the equipment is turned off.

Another important object of the invention is to provide an alarm dialing and transmitting system capable of delivering dialing pulses at a rate of 10 per second (p.p.s.) with a 40 percent make time and a 60 percent break time and a 600 millisecond interdigit time and capable of matching the 900 ohm impedance of the central office equipment to which the present system is coupled. The term "interdigit time" is defined in the AT&T Manual entitled "Notes on Nationwide Dialing" at Section IV paragraph 326 as follows: "The interdigit time is interval from the end of the last on hook pulse of one digit train to the beginning of the first off hook pulse of the next digit train." 600 milliseconds is the minimum allowable interdigit time (or time between digits) when pulsing into step-by-step selectors or the equivalent.

Related objects and advantages will become apparent as the description proceeds.

BRIEF DESCRIPTION OF THE DRAWING

The full nature of the invention will be understood from the accompanying drawings and the following description and claims.

DESCRIPTION OF THE PREFERRED EMBODIMENTS

Figure 1:
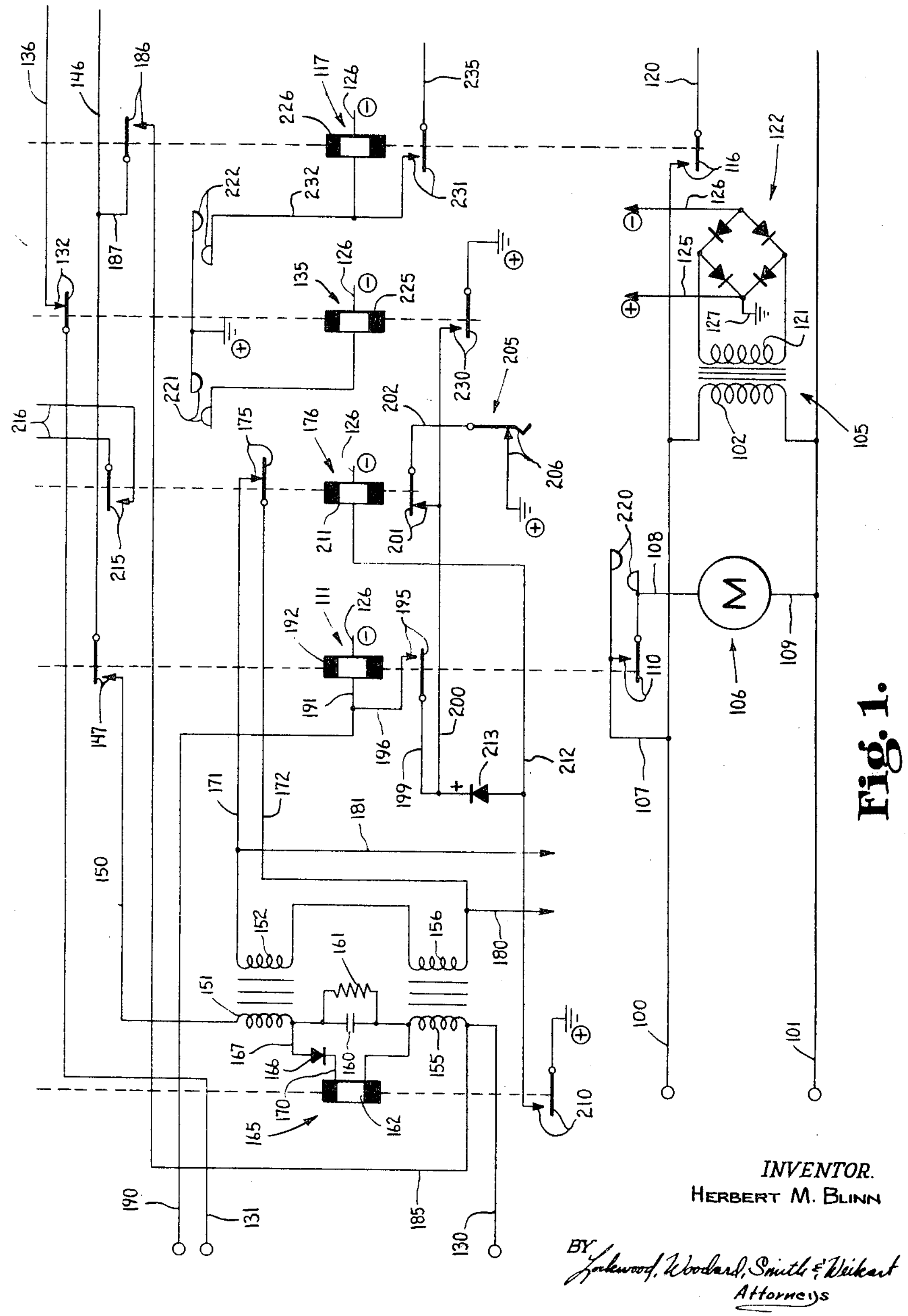
FIGS. 1 and 2 are each partial electrical schematic diagrams of the alarm dialing and transmitting equipment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figures 2, 3:
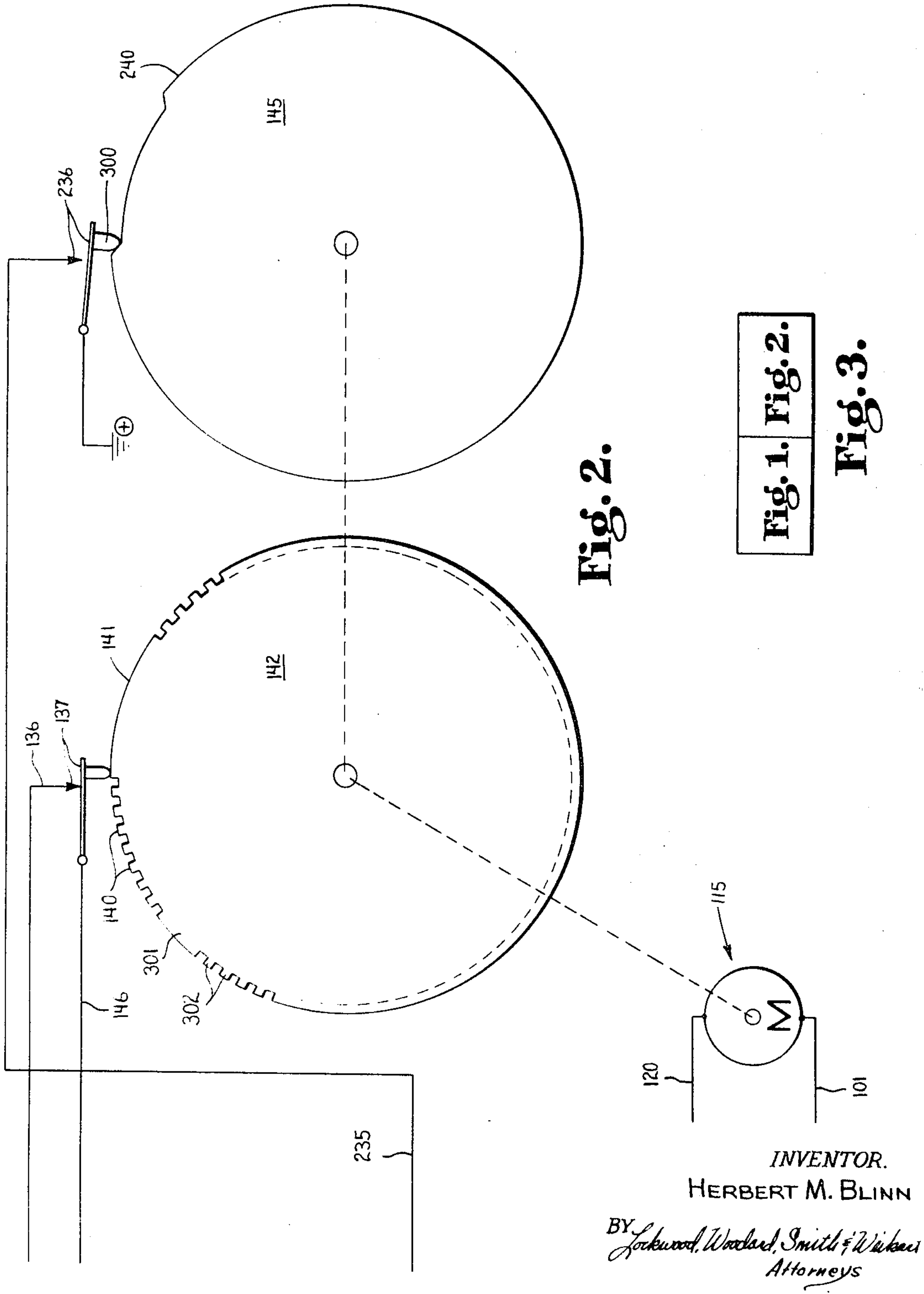
FIG. 3 is a schematic view indicating the manner in which FIGS. 1 and 2 should be assembled together to show the full schematic diagram of the electrical circuit.

Referring more particularly to FIGS. 1, 2 and 3 of the drawings, there is illustrated a pair of input leads 100 and 101 across which is connected the primary 102 of a transformer 105. Also connected across the leads 100 and 101 is the motor 106 of a conventional turn table record player which might be, for example, Model #22758–1, manufactured by V–M Corporation of 280

Park Street, Benton Harbor, Mich., modified as described below. The circuit to the motor 106 including leads 107, 108 and 109 is controlled by normally open contacts 110 of a start relay 111.

The lines 100 and 101 also function to supply power to an electrical motor 115. A set of normally open contacts 116 of an on relay 117 control the delivery of power from the line 100 to a line 120 for delivery to the motor 115 which has its other side connected to the lead 101. In one preferred embodiment of the present device the power supplied to the lines 100 and 101 is 110 volt, 60 cycle AC.

The transformer 105 may be, for example, adapted to drop the 110 volt supply to 48 volts across the secondary 121. A diode rectifier bridge 122 is connected across the secondary 121 of the transformer 105 and has output leads 125 and 126 with output lead 125 being positive and output lead 126 being negative. The lead 125 is grounded at 127 whereby the grounded lead of the various relays herein described are provided with a DC voltage of a polarity which is positive relative to the lead 126. At various points throughout the drawings, there is indicated for the relays an input lead marked with a negative sign. It should be understood that this negative sign indicates that the particular input lead is connected to the negative output lead 126 of the bridge 122.

A tip line 130 and a ring line 131 are provided and are adapted to be connected to the tip and ring leads from the telephone central office equipment which might be any type of conventional manual or machine switching equipment operable to provide a transmission circuit between a calling and a called subscriber. In other words, the tip line 130 and ring line 131 are connected in parallel with the subscriber's set or may be connected in place of or instead of the subscriber's set. The standard manner of operation of such tip and ring leads from the central office equipment is to provide to the subscriber's station a positive direct current voltage on the tip lead and a negative DC voltage on the ring lead. At the time that the called subscriber answers his telephone, this polarity of DC voltage is reversed.

The ring line 131 leads to the normally closed contacts 132 of an end relay 135, the contacts being in turn connected to a line 136 leading to dialer pulse contacts 137. The contacts 137 are spring biased to an open position and are closed by means of the raised portions 140 and 141 of a cam 142 mounted for positive drive by means of the output shaft of the dial motor 115. Also mounted for positive drive by the dialer motor is a cam 145.

The contacts 137 are connected between the line 136 and a further line 146 which leads to a set of normally open contacts 147 of the start relay 111. The contacts 147 are connected in series with a lead 150 which is coupled to one of the windings 151 of a standard repeating coil. The other windings thereof being 152, 155 and 156. Connected in parallel with one another are a capacitor 160 and a resistor 161. In one preferred embodiment of the invention the capacitor 160 might have a value of 1 mfd. while the resistor 161 might have a value of 200 ohms. Connected in parallel with the capacitor and resistor is a combination of the solenoid 162 of a supervisory relay 165 and a diode 166. The diode is so arranged as to permit positive flow of current only in the direction from the lead 167 to the lead 170 and to block flow of positive current in the opposite direction. The above mentioned parallel connected components are connected in series with the winding 155 of the repeater coil which winding is in turn connected in series with the line 130.

The windings 152 and 156 of the repeater coil are connected in series with one another across the lines 171 and 172 and may be shorted out by normally closed contacts 175 connected between the lines 171 and 172. The normally closed contacts 175 are a part of answer relay 176.

Leads 180 and 181 are connected across the windings 152 and 156 and to the leads 171 and 172 and lead to the audio output of the above mentioned record player. It can be appreciated that the only time that a message will be induced across the tip and ring leads 130 and 131, is when the contacts 175 of the relay 176 are open. Connected in shunt with the circuitry including the windings 151 and 155, the solenoid 162, the capacitor 160 and the resistor 161 is a line 185 which leads to the normally open contacts 186 of the relay 117. The contacts 186 couple the line 185 to line 187 which is in turn connected to the line 146.

The fifth wire or line leading into the present circuitry is start line 190. The start line 190 may be connected to a push button having its other side connected to ground or may be connected to any sort of switch with its other side connected to ground for initiating the operation of the circuitry of the present invention. For example, the start line 190 might be grounded as a result of a fire heating a switch sufficiently to cause closure thereof. The start line 190 leads to one side 191 of a solenoid 192 of the relay 111, the other side of the solenoid 192 being connected to the line 126. There is provided locking-in contacts 195 which are normally open contacts of the relay 111. The contacts 195 are connected to the line 191 by line 196 and to line 200 by the line 199. The line 200 is connected to ground through the normally closed contacts 201 of answer relay 176.

The normally closed contacts 201 are connected to a lead 202 which is in turn connected to a release key 205 normally effecting a closed circuit to ground but capable of being opened to separate its contacts 206 and to break the circuit to ground. The supervisory relay 165 controls normally open contacts 210 which are connected between ground and the solenoid 211 of the relay 176 by means of line 212. Connected between the lines 212 and 200 is a diode 213 permitting positive current flow in only one direction, that being from the line 212 to the line 200. The relay 176 has additional normally open contacts 215 which are closed when the solenoid 211 of the answer relay 176 is energized. The contacts 215 are connected across lines 216 which may lead to a clock and a recorder for indicating and recording the time at which the called station answers. The contacts 215 may control any associated apparatus, such as, a camera, sprinklers, etc. The above mentioned record player is conventional in all respects except the arm and the base thereof have cooperating contacts mounted thereon with the arm preferably carrying the ground or positive potential. The record player has a number of contacts 220, 221 and 222 which are opened or closed depending upon the position of the arm on the record player. Of course, the contacts 220 are conventional; however, the contacts 221 and 222 are a new addition to conventional equipment. Thus, one of each of the sets of contacts 220, 221 and 222 may be located on the base of the turn table while the other contact of each set is located on the record player arm. The contacts 220 are so positioned and arranged as to keep the turn table in operation until such time as the arm of the record player returns to its starting position. Thus, as soon as the contacts 110 are closed to energize the motor 106, the record player arm begins to move and closes the contacts 220, said contacts 220 maintaining the motor 106 energized until such time as the record player arm returns to its starting position.

The point at which the contacts 221 and 222 are opened and closed is discussed below in connection with the description of circuit operation. The contacts 221 and 222, however, respectively control the connection to ground of one side of the solenoids 225 and 226 of the end relay 135 and the on relay 117. Of course, the other side of each of the solenoids 225 and 226 is connected to the lead 126. The end relay 135 has a set of contacts 230 which are normally open and which control coupling to ground of the line 200. Relay 117 has a set of normally open contacts 231 which are arranged between line 232 and line 235. The line 235 leads to the contacts 236 which in turn lead to ground. The contacts 236 are spring biased to open position but may be closed by operation of the cam 145 and by engagement of the raised cam surface 240.

Further structural features of the circuitry will be described below in connection with a description of operation thereof. Assume now that a current signal is placed on the start lead 190 by the pressing of a push button or the like. The solenoid 192 of the relay 111 is energized causing the contacts 147, 195 and 110 to close. Closing of the contacts 195 locks in the relay 111 so that the solenoid thereof does not become de-energized by the disconnection of the line 190 from ground. Locking in of the solenoid 192 is accomplished through the line 126, the solenoid itself, the lines 191 and 196, contacts 195, line 200, contacts 201, line 202 and the contacts 206 of the release key 205. The closing of the contacts 147 provides a DC path to seize the telephone central office equipment through the tip lead 130, the winding 155, the resistor 161, winding 151, line 150, contacts 147, line 146, the dialer pulse contacts 137, the line 136, the contacts 132 and the ring line 131.

The closing of the contacts 110 provides an AC voltage to the turn table motor 106 through lines 100 and 107, contacts 110, line 108, the motor 106 and lines 109 and 101. At a predetermined time after the turn table arm has moved onto the record, the turn table contacts 220 and 222 are closed. The contacts 220 may be set to close immediately upon movement of the arm from rest position while the contacts 222 may be set to close at any predetermined time depending upon the position of the turn table arm relative to the record. Thus, the contacts 222 should be adjustable so that the closure thereof occurs, for example, from two to ten seconds after seizure of the central office equipment. The reason for providing such adjustment is to assure that the telephone company has sufficient time to provide a dial tone from the time of line seizure to the beginning of dialing pulses. The contacts 220 may be, for example, conventional feather spring contacts with the position of the turn table-base-mounted contact being adjustable to provide the desired time variation.

Closure of the contacts 220 locks in the motor 106 until the turn table arm returns to rest position.

Closing of the contacts 222 causes energization of the solenoid 226 of the relay 117 through ground, the contacts 222, the line 232, solenoid 226 and the line 126. Energization of the solenoid 226 of the relay 117 causes its contacts 186, 231 and 116 to be closed. The closure of the contacts 186 shorts out the impedance of the windings 151 and 155 and the resistor 161 to provide an improved low impedance pulsing circuit. The closure of the contacts 116 closes the AC circuit to the dialer motor 115 through the line 100, contacts 116, line 120, the motor 115 and the line 101. Energization of the motor 115 causes the motor to rotate its drive shaft and to rotate the cams 142 and 145 in a clockwise direction.

As the cam 145 begins to rotate the spring biased arm 300 is raised by the cam surface 240 causing the contacts 236 to close thus providing an additional path locking in the on relay 117 through its contact 231 and more particularly through the circuit including line 126, the solenoid 226, the line 232, contacts 231, the line 235, contacts 236 and ground.

Dialer cam 142 is prepared for any combination of a seven-digit number by blanking out the proper segments in the cam 142. Thus, the inter-digit code time is acquired by blanking out six segments between the digits. For example, the proportion 301 of the cam 142 is equal to six of the segments 302. The motor 115 drives the cams 142 and 145 to make one complete revolution in ten seconds. Each of the segments 302 on the cam 142 is shaped to open the pulse contacts 137 60 percent of the time and to close the contacts 40 percent of the time.

Before the cams 142 and 145 have completed one revolution, the contacts 222 of the turn table have opened because of the movement of the turn table arm on the record. As a result, the solenoid 226 of relay 117 is now held in energized condition under the control of the contacts 236 of cam 145. When the contacts 236 open at the end of nine seconds or, in other words, the time required for the pulsing contact 137 to pass over 90 of the segments (punched out or unpunched out) 302, the on relay 117 is de-energized. De-energization of the solenoid 226 opens the contacts 186 and thereby opens the short placed on the central office bridge. The de-energization of the solenoid 226 also opens the contacts 116 de-energizing the dialer motor 115. The dialer assembly which includes the cams 142 and 145 and the motor 115 is then back to the normal starting or rest position.

When the dialed number is answered by the called party, ground and battery potential standing on the tip and ring leads 130 and 131 are reversed by the central office equipment. Such reversal makes possible the flow of current through the diode 166 associated with the supervisory relay 165 causing the solenoid 162 of the relay 165 to be energized and the contacts 210 of the relay to be closed.

The contacts 210 of the supervisory relay 165 provide an additional holding circuit for the start relay through the line 212, the diode 213, the line 199, the contacts 195, the lines 196 and 191, the solenoid 192 and the line 126. The contacts 210 of the relay 165 also provides a ground through the line 212 to operate the answer relay 176. Energization of solenoid 211 causes the contacts 201 of the relay to be opened and thereby removes the original holding ground for the start relay 111. Energization of the answer relay 176 also opens the contacts 175 on the drop side winding of the repeater coil permitting the recorded message to be induced on the windings 151 and 155 from the windings 152 and 156. Of course, as long as the record player arm is on the record on the turn table, the recorded message is being "played" but the message is not induced into the windings 151 and 155 until the contacts 175 are opened.

After the called party has heard the recorded message over the thus established transmission circuit, the called party restores the called end of the circuit to normal causing the central office equipment to reverse the potential on the tip and ring leads 130 and 131. Thus, ground from the central office equipment again appears on the tip lead 130 while a battery potential is present on the ring lead 131. As a result of this condition, the relay 165 no longer is energized through the diode 166 whereby the relay 165 opens its contacts 210 permitting the start relay 111 and the answer relay 176 to have their solenoids 192 and 211 de-energized. The answer relay 176 is provided with slow-to-release winding whereby the contacts 195 of the start relay will be open before the contacts 201 of the answer relay can close thus breaking the ground connection to the start relay holding circuit.

The de-energization of the solenoid 192 of the start relay opens the contacts 147 removing the holding circuit to the central office equipment and permitting its return to normal. Opening of the contacts 110 of the start relay removes one of the paths for AC current to the turn table motor 115; however, the contacts 220 of the turn table arm are maintained closed until the turn table arm returns to its resting position whereby a complete cycle of the turn table operation is insured to place the turn table in readiness for the next cycle of the equipment.

Assume now that the dialed number is not answered by the time that the record playing time is complete. The contacts 221 of the turn table are closed energizing the solenoid 225 of the end relay 135. The operation of the end relay 135 opens the contacts 132 permitting the central office equipment to release in the manner explained above. The closing of the contacts 230 on the end relay provides an addition holding circuit for the start relay through its contacts 195. The thus locked in start relay insures that a complete cycle of the equipment operating as explained above will again take place. In other words the present equipment will continue to dial and release the called station until it is rung and answered or until such time as the contacts 206 of the release key 205 are opened.

Figure 5:
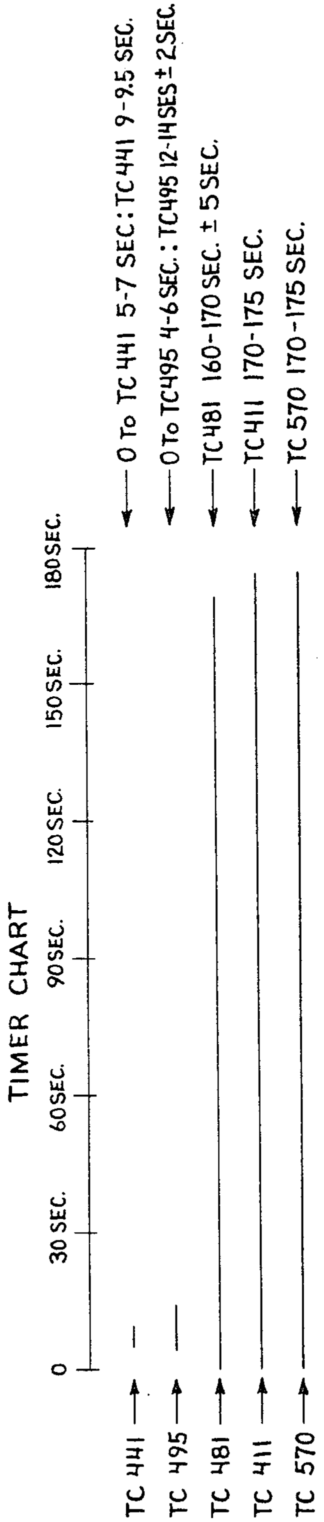
FIG. 5 is a chart illustrating the time sequence of operation of a timer forming a part of the present apparatus.
Figure 4:
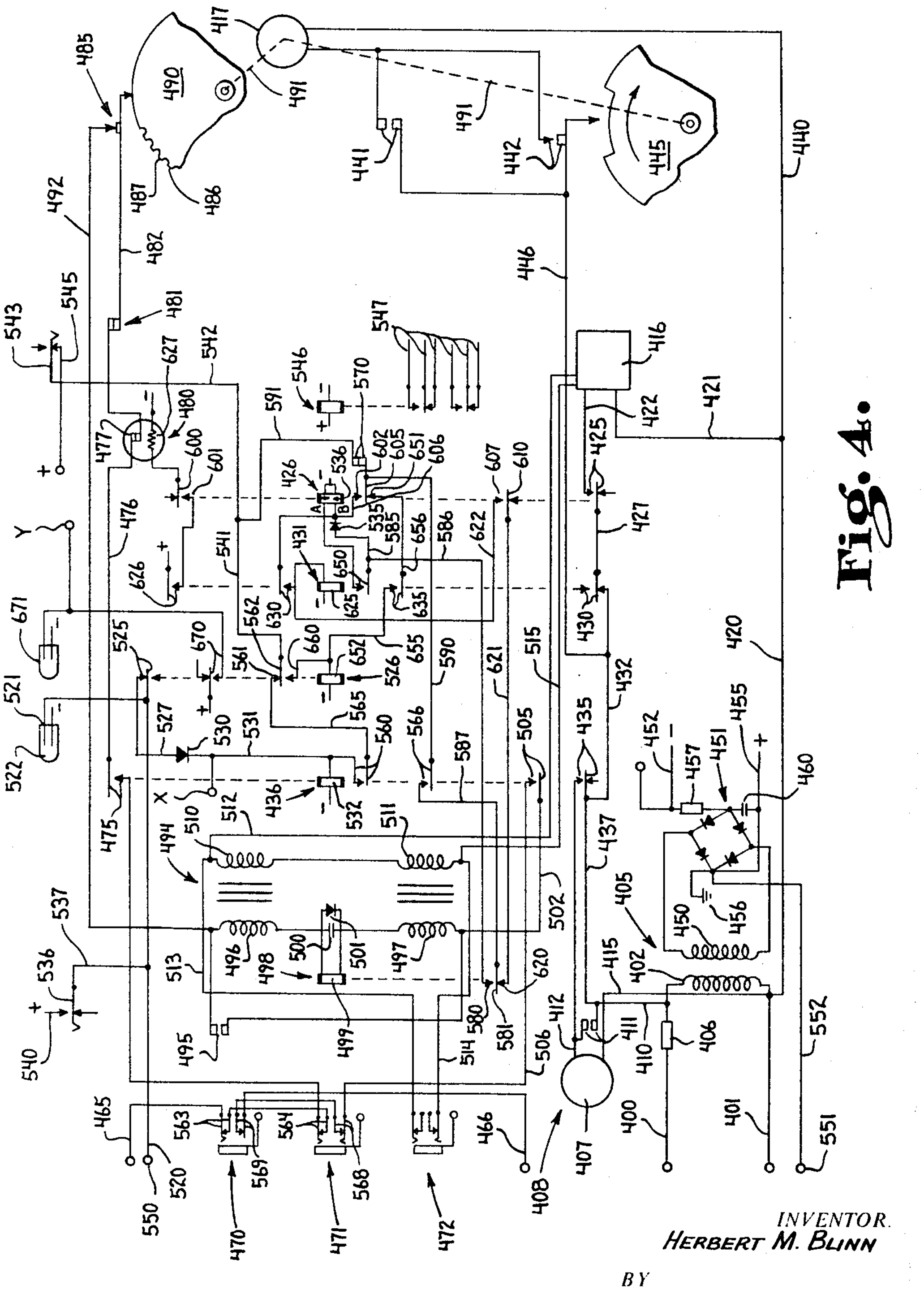
FIG. 4 is an electrical schematic diagram of an alternative embodiment of the alarm dialing and transmitting equipment of the present invention.

Referring now more particularly to FIGS. 4 and 5, there is illustrated a pair of input leads 400 and 401 across which is connected the primary 402 of a transformer 405. A suitable fuse 406, for example a 3 amp AC fuse, is connected in the line 400. Also connected across the leads 400 and 401 is a timer motor 407 of a timer device 408. The power input circuit to the timer motor 407 includes the lead 410, the contacts 411, the lead 412 and the lead 415.

The lines 400 and 401 also function to supply power to a tape recorder 416 and a dialer electrical motor 417. The circuit to the tape recorder 416 is through the line 401, the leads 420 and 421, the tape recorder, the lead 422, the normally open contacts 425 of an answer II relay 426, the lead 427, the normally closed contacts 430 of an answer I relay 431, the lead 432, the lead 437 and the lead 410 as well as the line 400. The circuit to the electrical motor 417 includes the line 401, the lead 420, the lead 440, the electrical motor 417, alternative paths through the path including the contacts 441 with their respective leads or the parallel alternative path through the contacts 442 operated by the cam 445. The circuit further includes after passing through the alternative route of the contacts 441 or the contacts 442, the lead 446, the lead 432, the leads 437 and 410 and the line 400.

The function of the transformer 405 is to drop the 110 volt supply on the lines 400 and 401 to a 50 volt supply across the secondary 450. A diode rectifier bridge 451 is connected across the secondary 450 of the transformer 405 and has output leads 452 and 455, with the output lead 452 being negative and the output lead 455 being positive. The lead 455 is grounded at 456 whereby the grounded lead of the various relays herein described are provided with a DC voltage of a polarity which is positive relative to the lead 452. Throughout the drawing the grounded leads of the relays are marked with a positive sign. At various points throughout FIG. 5 there is indicated for the relays an input lead marked with a negative sign. It should be understood that this negative lead indicates that the particular input lead is connected to the negative output lead 452 of the bridge 451.

A fuse 457 is provided in the output line 452. Also a capacitor 460, for example, of 200 microfarads capacitance is connected from one output corner of the bridge 451 to the line 455 and serves as an output filter for the DC across the lines 452 and 455. A tip line 465 and a ring line 466 are provided and are adapted to be connected to the tip and ring leads from the telephone central office equipment which might be any type of conventional, manual or machine switching equipment operable to provide a transmission circuit between a calling and a called subscriber. In other words, the tip line 465 and ring line 466 are connected in parallel with the subscriber's set or may be connected in place of or instead of the subscriber's set.

There is also provided a line jack 470, an equipment jack 471 and a monitor jack 472. The tip line 465 leads through the line jack and the equipment jack to the normally open contacts 475 of the relay 436, the contacts 475 being in turn connected to a lead 476 which is coupled to normally closed contacts 477 of a time delay relay 480. The contacts 477 are connected in turn to the contacts 481 of the timer 408, which contacts are in turn connected to a line 482 leading to pulse contacts 485. The contacts 485 are spring biased to an open position and are closed by means of the raised portions 486 and 487 of a cam 490 mounted for positive drive by means of the output shaft 491 of the electrical motor 417. Also mounted for positive drive by the electrical motor 417 is the cam 445 which operates the spring biased open contacts 442. Preferably the dialer motor 417 has a 6 r.p.m. speed so that it makes one turn in 10 seconds. Also, the cam 490 is preferably provided with 100 teeth thus making the space between teeth equal to 100 milliseconds. Of course, the seven digits to be dialed are set up by blanking out the required teeth on the pulse cam.

The contacts 485 are connected between the line 482 and a further line 492 which leads to the parallel connection of contacts 495 of the timer 408 and a portion of the repeat coil 494. The portion of the repeat coil includes the inductances 496 and 497 between which is connected the solenoid 499 of the polarized relay 498. The one parallel path including the relay 498 and the inductances 496 and 497 also includes capacitor 500 and rectifier 501 with the capacitor 500 having a representative value of 1 mf. These two parallel circuits are in turn connected to a lead 502 which is connected to the normally open contacts 505 of the relay 436. The contacts 505 are connected through the lead 506 to the ring lead 466 through the equipment jack 471 and the line jack 470. As mentioned, the windings 496 and 497 are the windings of a standard repeating coil 494, the other windings thereof being the windings 510 and 511.

The windings 510 and 511 of the repeating coil 494 are connected in series with one another across the lines 513 and 514 which lead to the jack 472. The windings 496 and 497 are inductively coupled to the windings 510 and 511 and can be shorted out by closing of the contacts 495. Leads 512 and 515 are connected across the windings 510 and 511 and lead to the output of the tape recorder 416. It can be appreciated that the only time that a message will be induced into the windings 496 and 497 and across the tip and ring leads 465 and 466 is when the contacts 495 of the timer 407 are opened whereby the capacitance 500 acts as an AC path for audio current.

The fifth wire or line leading into the present circuitry is the start line 520. The start line 520 may be connected to a push button having its other side connected to ground or may be connected to any sort of switch with its other side connected to ground for initiating the operation of the circuitry of the present invention. The start line 520 leads to one side 521 of an alarm lamp 522. The start line 520 also leads to normally closed contacts 525 of a check relay 526. The contacts 525 are in turn connected to line 527 which is connected to a rectifier 530. The rectifier 530 is connected through line 531 to the solenoid 532 of the relay 436.

The various rectifiers 501, 530 and 535 (adjacent the solenoid 536 of relay 426) cause the relays with which they are associated to receive current flow in only one direction at least in certain stages of their operation. Thus, the supervisory relay 498 is polarized while the operation of relays 436 and 426 and rectifiers 530 and 535 will be described below. A non-locking test key 536 which can be used to ground the line 520 through lines 537 and 540 is provided for test actuating the equipment. A non-locking check key 543 which can be used to open the ground to lead 542 through the lead 545 is provided for placing the equipment back into prealarm condition after the equipment has been operated without receiving the proper answer. The relay 546 is a power failure relay which is normally energized but when deenergized provides a means through line 547 to operate external audio and visual alarm signals if required.

The remaining circuit structure illustrated in FIG. 4 will be described in connection with a description of the operation of the circuit. In order to operate the present device, the terminal 550 of the start lead 520 is shorted to the terminal 551 of the line 552 connected to the positive side or the ground side of the rectifier bridge 451. A voltage is thereby placed across the alarm lamp 522 lighting it and the start relay 436 is energized through the normally closed contacts 525 of the relay 526, the line 527, the rectifier 530, the line 531 and the solenoid 532 of the relay 436 to the line 542. Energization of the solenoid 532 of the start relay 436 causes the contacts 560 of the relay 436 to close, locking in the relay 436 through the normally closed contacts 561 and 562 of the check relay 526. The complete locking in path of the solenoid 532 of the relay 436 is through the solenoid 532, the contacts 560, the line 565, the contacts 561 and 562, the lines 541 and 542, the check key 543 and the line 545 to ground.

The energization of the start relay 436 also closes a DC bridge to seize the central office line circuit. This is accomplished through the following circuit: the tip lead 465 through the spring biased closed contacts 563 of the line jack 470 and the spring biased closed contacts 564 of the equipment jack 471, the closed contacts 475 of the start relay 436, the line 476, the closed contacts 477 of a time delay relay 480, the timer contacts 481 of the timer 408, the line 482, the pulse contacts 485 on the dialer cam 490, the line 492, the winding 496 of the repeat coil, the diode 501, the winding 497, lead 502, the closed contacts 505 of the start relay 436, the lead 506, the spring biased closed contacts 568 of the equipment jack 471 and the spring biased closed contacts 569 of the line jack 470 to the ring line 466 of the central office.

The energization of the start relay 436 also closes contacts 566 preparing a path for the future operation of the answer I relay 431 and the answer II relay 426. The energization of the start relay 436 also closes its contacts 435 providing an AC path to the motor 407 of the timer 408, said path being through the lead 401, the line 415, the motor 407, the line 412, the contacts 435, the lead 437, the fuse 406 and the line 400. Thus, the timer motor 407 is now energized. Referring to FIG. 5, there is illustrated a chart which shows the sequence of closure of the various contacts for the timer 408. To the right of the chart there is listed the closure times and the time at which the closure of the contacts is effected. For example, the first two contacts do not immediately close but instead close after 5 to 7 seconds and 4 to 6 seconds, respectively, whereas the other three contacts do immediately close upon operation of the timer motor 407.

As described above, operation of the start relay 436 places a DC bridge on the central office equipment which causes the central office line circuit to place a demand on the central office equipment for a dialing path. When such a dialing path is available, a dial tone is returned back to the telephone subscriber so that dialing can begin. The period of time between line seizure and the beginning of dialing or the rendering of a dial tone not only differs greatly between different types of central office equipment such as, for example, step by step and crossbar, but even varies within line groups. Thus, by the use of an adjustable cam on the sequence timer 408, a simple means of proper seizure time is effected. As mentioned, immediately upon the energization of the timer motor 407, the timer cams which operate the contacts 481, 411 and 570 operate to close their respective contacts. With regard to the cams closing the contacts 441 and 495, the contacts 441 close in approximately 3 to 10 seconds, this time period being determined with regard to the time allotted from line seizure to the beginning of dialing. The contacts 495 should be adjusted so as to close approximately 1 to 2 seconds before the closure of the contacts 441 and should remain closed approximately 12 seconds. The closing of the contacts 495 shorts out the windings 496 and 497 of the repeat coil and also the associated condensor 500, relay 498 and the diode 501. The purpose of this shorting out is to improve the pulsing circuit to the central office equipment and is accomplished just prior to the beginning of dialing by the present apparatus.

A second or so after the closure of the contacts 495, the contacts 441 close thereby energizing the dialer motor 417 through the line 401, the lines 420 and 440, the motor 417, contacts 441, the line 446, the line 432, the line 437 and line 410, the fuse 406 and the line 400. Once the dialer motor 417 has moved from a rest position, it comes under the control of the off normal dial cam 445. In other words, the cam 445 is positively secured to the output shaft 491 of the motor 417. Once the cam 445 has turned from the rest position, the contacts 442 are closed and remain closed until the motor 417 has completed its cycle and has completed a single rotation of the shaft 491.

The dialer motor 417 and the dialer cam 490 then pulse into the central office the information programmed on the pulsing cam 490 by the opening and closing of the contacts 485. When the called party answers, the polarity on the leads 465 and 466 is reversed by the central office equipment causing the supervisory relay 498 to be energized by reason of the blocking of the current by the diode 501. It should, of course, be mentioned that the called party will not answer the telephone until after the number has been completely dialed by the cam 490 and until after the timer contacts 495 have again opened, placing the voltage drop across the windings 496 and 497 of the repeat coil as well as the three components 498, 500 and 501.

When the supervisory relay 498 has its solenoid 499 energized, the contacts 580 and 581 are closed, causing the B winding of the answer II relay 426 to be energized. This energization takes place through the solenoid 536, the diode 535, the line 585, the line 586, the contacts 580 and 581, the line 587, the contacts 566, the line 590, the timer contacts 570, the line 591, the line 542, the check key 543 and the line 545 to ground. The answer II relay 426 then operates or has its B winding energized so as to close its contacts 600 and 601, thus preparing a path to the time delay relay 480. Energization of the B winding of the relay 426 also provides a locking path for the solenoid 536 through the contacts 602 and 605. As mentioned above, ground or positive is on the timer contacts 570. Therefore, the circuit is closed through the contacts 570, 602, 605, the line 606, and the B winding to the negative connection of the solenoid 536. The energization of the relay 426 B winding of the solenoid 536 also closes contacts 607 and 610 so as to prepare a path through them for future operation of the answer I relay 431 at such time as the supervisory relay 498 is de-energized.

The energization of the B winding of the solenoid 536 of the relay 426 also closes the contacts 425 whereby the tape recorder 416 is started. The circuit to the tape recorder is through the line 401, the lead 420, the line 421, the tape recorder itself 416, the line 422, the contacts 425, the line 427, the contacts 430, the lead 432, the lead 437, the line 410, the fuse 406 and the line 400. Since the tape recorder 416 has its output connected across the windings 510 and 511 of the repeat coil by means of the lines 512 and 515, the message in the tape recorder is then transmitted to the called party.

Let us assume now that a wrong number is reached by faulty operation of the central office equipment or that the person reached is the correct station or subscriber but is not someone who is briefed on the manner of releasing the present equipment. In such a situation, the party who has answered the telephone will hang up the telephone after he has listened to the message for a period of time. The hanging up of the called telephone will cause the supervisory relay 498 to release by reason of the reversal of the polarity on the tip and ring leads 465 and 466 and the shunting of the solenoid 499 by the diode 501.

When the supervisory relay 498 releases, the ground or positive potential on the contact 581 of the relay 498 is connected through the contact 620 so as to energize the answer I relay 431 through the following circuit: the contact 581, the contact 620, the line 621, the contacts 610 and 607, the line 622 and the solenoid 625 of the answer I relay. The energization of the solenoid 625 of the answer I relay 431 causes the normally open contacts 626 to close thereby energizing the filament 627 of the time delay relay 480. The energization of the solenoid 625 also causes the closure of the relay contacts 630 thereby locking in the solenoid 625 to ground through the lead 606, the contacts 602 and 605, the contacts 570 and the line 591 and the line 542, the check key 543 and the line 545.

The energization of the answer I relay 431 also prepares a path for the future operation of the check relay 526 through the contacts 635. Also, the energization of the relay 431 opens the contacts 430 causing the tape recorder 416 to stop and to cease delivering its message across the windings 410 and 411. After perhaps one to one and one-half seconds of energization of the filament 627 of the time delay relay 480, the contacts 477 of the time delay relay are opened. The opening of the time delay relay contacts opens the DC bridge on the telephone central office equipment thereby releasing the equipment. It will be noted that the relays now energized in the circuit at this time are the start relay 436, the answer I relay 431 and the answer II relay 426 as well as the time delay relay 480. The supervisory relay 498 is de-energized. Of course, the sequence timer 408 is operating by reason of the closed contacts 435 of relay 436 and parallel contacts 411 of the timer.

At about 170 to 175 seconds after the beginning of the operation of the timer motor 407, the timer contacts 570 will open thereby releasing and de-energizing the answer I relay 431 and the answer II relay 426. The start relay 436 will remain energized however.

De-energization of the relays 431 and 426 opens their contacts 626 and 600 and 601, de-energizing the filament 627 and thereby permitting closure of the contacts 477. It should be mentioned, however, that the timer contacts 481 which as shown on the chart of FIG. 5 remain closed for approximately 160 to 170 seconds will have previously opened so that the circuit across the tip and ring leads from the central office will remain open even though the contacts 477 of the time delay relay close. Of course, the various circuits through the contacts of the answer I relay 431 and the answer II relay 426 will open readying the circuitry for another operation. It will be noted that the start relay 436 remains energized; consequently, the timer motor 407 will continue to turn and will turn past the opening of all of the contacts 441, 495, 481, 411 and 570 until all of the contacts again close, causing the apparatus to move through another calling operation as above described.

Let us assume now that the correct party is reached on the correct telephone number and that a party knows the proper manner to reply to the call from the present apparatus. This proper manner of reply might involve dialing any particular number on the telephone set such as, for example, dialing the numeral "1" so that the single pulse is sent back through the tip and ring leads 465 and 466 from the called party's station.

As explained above, when the called party answers, a supervisory relay 498 causes the answer II relay 426 to operate and when the called party hangs up the answer I relay 431 is operated and energized. There is after such hanging up approximately one to one and one-half seconds during which the time delay relay 480 is energized but the contacts 477 are not open. Assume instead of hanging up that the called party dials the numeral "1." Such dialing causes a de-energization and re-energization of the supervisory relay 498 and more particularly the solenoid 499 thereof. As explained above, the de-energization of the supervisory relay causes energization of the answer I relay 431. Re-energization of the supervisory relay causes ground to be placed on the contact 580 of the supervisory relay from the contact 581 and through the closed contacts 650 of the answer I relay so as to energize the A winding of the answer II relay 426. Thus, the answer II relay 426 has both of its windings energized and therefore, because its windings A and B are connected opposing, the solenoid 536 is effectively de-energized and all of its contacts move to the de-energized position. The path of energization of the A winding is through the A winding, the contacts 650, the line 586, the contacts 580 and 581, the line 587, the contacts 566, the line 590, the contacts 570, the line 591, the line 542, the check key 543 to the line 545.

When the answer II relay is released, its contacts 602 and 605 open and its contacts 605 and 651 close. Thus, the ground on contacts 570 is connected through contacts 605 and 651 and closed contacts 635 to the solenoid 652 of the check relay 526. The complete circuit includes the solenoid 652, the line 655, the closed contacts 635, the line 656, the closed contacts 651 and 605, the contacts 570 the line 591, the line 542, the check key 543 and the line 545. Also, the release of the double wound relay 426 opens the contacts 600 and 601 preventing the filament 627 of the time delay relay 480 from opening of the contacts 477. Of course, the contacts 425 are also opened by the release of relay 426; however, this is of no importance at this time inasmuch as the answer I relay 431 is energized at this time. It might be pointed out at this time that the diode 535 is wired into the circuit to prevent the ground on the timer contacts 570 from backing up through the contacts 650 of the answer I relay 431 and flowing into the A winding of the answer II relay 426 on the release of the supervisory relay 499.

As explained above, the solenoid 652 of the check relay 526 has been energized. Energization of this relay locks in the relay by the closing of contacts 652 and 660. Of course, the contacts 525 are opened by energization of the relay 526 which de-energizes the start relay 436. Also, the opening of the contacts 561 and 562 removes the locking ground for the start relay. The check relay 526 also includes contacts 670 which are closed by the energization of the relay, thereby placing a voltage across a check lamp 671 indicating that the device has completed its operation and has reached the called party who has given the proper return signal.

As mentioned, the start relay 436 has been caused to de-energize or release. Such de-energization opens the bridge to the telephone central office equipment when the contacts 475 open and the contacts 505 open. The opening of the contacts 505 also removes the solenoid 499 of the supervisory relay 498 from energization and from the circuit. Release of the start relay 436 also opens contacts 566 which opens the path to the answer I relay 431 and the answer II relay 426 thereby de-energizing both relays. The de-energization of the solenoid of the start relay 436 also removes one of the AC paths to the timer motor by reason of the opening of contacts 435.

It will be noted that the answer I relay 431 must release. The answer I relay has two possible holding paths, one being through the contacts 630 and the other through the contacts 607–610 of answer II relay 426 which, as explained above, are now open by reason of the release of the start relay 436 and answer II relay 426. Assuming that the supervisory relay 498 has not yet been released or de-energized, the de-energization of the answer II relay 426, the answer I relay and start relay 436 assures that no paths are provided for the supervisory relay to remain energized.

The sequence timer 408 is now under the control of its own cam contacts 411. Thus, the timer motor 407 will continue to rotate until the contacts 411 open thereby leaving the position of the timer motor 407 in preparation for a further cycle of the apparatus with all of the contacts of the timer in open position. The equipment has now completed its operation. The check relay 526 is, of course, energized and is locked in through its contacts 562 and 660. Also, the che ck lamp 671 is energized, showing that the equipment has completed a successful cycle. The alarm lamp 522 may or may not still be burning depending upon whether or not the start ground signal is still on the start lead 465. In order to place the equipment back to its original condition for additional operation, the check key 543 is operated thereby breaking the circuit to ground of lead 545 and de-energizing the check relay 526.

De-energization of the check relay 526, of course, opens the circuit to the check lamp 671 by reason of the opening of the contacts 670. All other paths controlled by the check relay 526 are restored to the original or normal condition. It should be noted that if the alarm lamp 522 is still burning at the time the check key is operated, the equipment will start a new cycle of operation. Thus, the ground on the start lead 520 or terminal 550 must be removed before the check key is operated.

It should be understood that the present circuit is designed to include an alarm lamp 522 and a check lamp 671 to give a visiual indication of the operation of the device. One side of the alarm lamp 522 is connected to negative output lead 452 and the other side is connected to lead 520. Because of the action of the blocking diode 530, the alarm lamp 522 will be energized only when ground appears on lead 520.

The check lamp 671 has one side connected to the negative output lead 452 and the other side connected through contacts 670 of relay 526 to ground. When the called party signals back, energizing relay 526, contacts 670 close and energize the check lamp 671.

The circuit also provides for external monitor and check lamps (not shown). The external monitor lamp is connected between a terminal X connected to lead 531 and the negative output lead 452. When ground appears on line 520, the external monitor lamp is energized through terminal X, diode 530, contacts 525 and line 520. Even if the ground is then removed from lead 520, the external monitor lamp will remain energized through terminal X, lead 531, contacts 560 (now closed), lead 565, contacts 561–562, lead 541, lead 542, check key 543 and the line 545.

The external check lamp, by means of a terminal Y connected to one side of check lamp 671 and a connection to the negative output lead 452, is connected in parallel with check lamp 671.

In operation, the external monitor lamp and external check lamp will be located, for example, at the bedside of a sick person. When he makes a call, thereby grounding line 520, the external monitor lamp will light, and remain lighted until the called party answers and signals back, at which time the check relay 526 is energized and opens contacts 561–562 to extinguish it. Simultaneously, relay 526 closes contacts 670 to energize the check lamps, indicating to the sick person that his call has been answered.

Assume now that the present equipment while operating runs into an overflow busy situation at the central telephone office or assume alternatively that the called party fails to answer the telephone. Referring back to the previous description of operation, it will be remembered that only the start relay has been energized but no other relays. Thus, the signal on the start lead 520 or terminal 550 operates the start relay 436 and thereby locks in the start relay through the contacts 560. If either the central office is busy or the called party fails to answer, the supervisory relay 498 will not be operated or energized during the first complete sequence of the timer and, therefore, no additional relays in the circuit will be operated. Near the end of the timer cycle and the first rotation of the cam operating the contacts 481, the cam will permit the contacts 481 to open thus releasing the DC bridge on the telephone central office equipment. When the timer 408 reaches the zero time condition, the contacts 481, 411 and 570 are all closed and a new call is started. Thus the apparatus will continue to redial the desired station until the station answers and gives the proper response.

Although the present embodiment is programmed to respond to a single pulse from the called station, the apparatus could be modified to respond to more than one pulse or to a tone of predetermined frequency or to simultaneous tones of predetermined frequency as, for example, used in newer types of Bell System dialing. Still another modification that might be made in the system within the scope of the invention would involve placing the dialing information directly on the tape recorder in the form of tones or pairs of tones so that the pulsing of the cam 490 is replaced by a predetermined set or group of tones.

From the above description it will be evident that the present invention provides improved alarm dialing and transmitting equipment. It will also be evident that the present invention provides alarm dialing and transmitting equipment which eliminates cumbersome, expensive means for lifting the handpiece off of the hook. It will be further evident that the alarm dialing and transmitting equipment of the present invention incorporates circuitry which is not prevented from delivering the alarm because of a busy signal or an overload signal. It can also be appreciated that the present apparatus is not prevented from operating by reaching a wrong number or by reaching the right number but without the right person to receive the message.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. An automatic alarm system for use with a telephone arrangement including a tip lead and a ring lead, central office equipment connected to said tip lead and ring lead and arranged to reverse the DC polarity thereon when the set at a dialed subscriber station is answered; said alarm system comprising means for connecting said tip lead to said ring lead through a low resistance path to seize the central office equipment dialing means for dialing a subscriber station through said central office equipment, means for shorting out said low resistance path during the time said dialing means is dialing a subscriber station to provide an improved pulsing circuit between said tip and ring leads, means responsive to changed polarity on the tip and ring leads for inducing a recorded message signal in an inductance means to thereby deliver a message to the dialed subscriber station, said dialing means including a pair of pulsing contacts in series with said low resistance path, said inductance means including a first and a second winding of a repeating coil, said means for inducing a recorded signal in said inductance means including a third and a fourth winding of said repeating coil, a record player and a circuit connecting said record player and said third and fourth windings, shorting contacts in said circuit in parallel with said record player for shorting out said third and fourth windings; an answer relay controlling said contacts, a supervisory relay controlling said answer relay, a diode in series with said supervisory relay, said diode and supervisory relay, said diode and supervisory relay being in parallel with a capacitor and resistor, said diode permitting current flow through said supervisory relay from said tip and ring leads only when the DC polarity thereon is reversed by the answering of the set at a dialed subscriber station whereby said supervisory relay is operated to control said answer relay and said answer relay is operated to open said shorting contacts for delivery of the recorded message to the subscriber station.

2. The invention according to claim 1 further comprising a pair of adjustable contacts operated by the turn table arm of said record player and connected to said dialing means to initiate the operation of said dialing means a predetermined time after line seizure to assure that the telephone company has sufficient time to provide a dial tone from the time of line seizure to the beginning of dialing pulses.

3. The invention according to claim 2 wherein said means responsive to changed polarity on the tip and ring leads includes the operating coil of a supervisory relay connected in series with a diode, said series combination of said operating coil and said diode being connected in parallel with said capacitor and resistor, and said diode oriented to permit current to flow through said operating coil when the ring lead is positive with respect to the tip lead.

4. An automatic alarm system for use with a telephone arrangement including a tip lead and a ring lead, central office equipment connected to said tip lead and ring lead and arranged to reverse the DC polarity thereon when the set at a dialed subscriber station is answered; said alarm system comprising means for connecting said tip lead to said ring lead through a low resistance path to seize the central office equipment, dialing means for dialing a subscriber station through said central office equipment, means for shorting out said low resistance path during the time said dialing means is dialing a subscriber station to provide an improved pulsing circuit between said tip and ring leads, means responsive to changed polarity on the tip and ring leads for inducing a recorded message signal in an inductance means to thereby deliver a message to the dialed subscriber station, said low resistance path including a capacitor and a resistor connected in parallel with one another and the parallel combination of said capacitor nad resistor connected in series with an inductance means, said low resistance path including a first winding of a repeating coil, said first winding having one end connected to said tip lead, the other end of said first winding being connected to one end of the parallel combination of a diode, a capacitor, and the operating coil of a supervisory relay, the other end of said parallel combination being connected to one end of a second winding of said repeating coil, and the other end of said second winding being connected through contact means to said ring lead.

5. An automatic alarm system for use with a telephone arrangement including a tip lead and a ring lead, central office equipment connected to said tip lead and ring lead and arranged to reverse the DC polarity thereon when the set at a dialed subscriber station is answered; said alarm system comprising means for connecting said tip lead to said ring lead through a low resistance path to seize the central office equipment, dialing means for dialing a subscriber station through said central office equipment, means for shorting out said low resistance path during the time said dialing means is dialing a subscriber station to provide an improved pulsing circuit between said tip and ring leads, means responsive to changed polarity on the tip and ring leads for inducing a recorded message signal in an inductance means to thereby deliver a message to the dialed subscriber station, a line test jack, an equipment test jack and a monitor test jack, said line test jack being connected to said tip and ring leads so that when a test plug of test apparatus is inserted therein said alarm system is disconnected from said tip and ring leads and said test apparatus is connected to said tip and ring leads, said equipment test jack being connected to said tip and ring leads so that when said test plug is inserted therein said alarm system is disconnected from said tip and ring leads and said test apparatus is connected to said alarm system, said monitor test jack being connected to said tip and ring leads so that when said test plug is inserted therein said test apparatus is connected to said tip and ring leads while said alarm system is connected to said tip and ring leads.

References Cited

UNITED STATES PATENTS

| | | | |
|---|---|---|---|
| 2,469,278 | 5/1949 | Sears | 179—5 |
| 2,780,671 | 2/1957 | Thery | 179—5 |
| 2,886,641 | 5/1959 | Lomax | 179—6.3 |
| 3,038,967 | 6/1962 | Andrews | 179—5 |
| 3,120,579 | 2/1964 | Stewart | 179—5 X |
| 3,188,392 | 6/1965 | Ferrell | 179—5 |
| 3,233,232 | 2/1966 | Brennon | 179—5 X |

ROBERT L. GRIFFIN, *Primary Examiner.*

WILLIAM S. FROMMER, *Assistant Examiner.*